US011263815B2

(12) United States Patent
Alam et al.

(10) Patent No.: US 11,263,815 B2
(45) Date of Patent: Mar. 1, 2022

(54) ADAPTABLE VR AND AR CONTENT FOR LEARNING BASED ON USER'S INTERESTS

(71) Applicant: INTERNATIONAL BUSINESS MACHINES CORPORATION, Armonk, NY (US)

(72) Inventors: Nebula Alam, Essendon (AU); Simon Harris, Victoria (AU); Shaila Pervin, Docklands (AU); Andrew Rawlinson, Melbourne (AU); Wanita Sherchan, Clayton South (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 16/115,209

(22) Filed: Aug. 28, 2018

(65) Prior Publication Data

US 2020/0074732 A1     Mar. 5, 2020

(51) Int. Cl.
*G06F 16/435*     (2019.01)
*G06F 16/9535*     (2019.01)
*G06T 19/00*     (2011.01)
*G09B 5/12*     (2006.01)

(52) U.S. Cl.
CPC .......... *G06T 19/006* (2013.01); *G06F 16/437* (2019.01); *G06F 16/9535* (2019.01); *G09B 5/12* (2013.01)

(58) Field of Classification Search
None
See application file for complete search history.

(56) References Cited

U.S. PATENT DOCUMENTS

| 8,814,691 | B2 | 8/2014 | Haddick et al. |
| 2008/0071559 | A1 | 3/2008 | Arrasvuori |
| 2013/0147837 | A1 | 6/2013 | Stroila |
| 2013/0204881 | A1* | 8/2013 | Su .......................... G06N 5/043 |
| | | | 707/749 |
| 2014/0171039 | A1 | 6/2014 | Bjontegard |
| 2017/0256096 | A1 | 9/2017 | Faaborg et al. |
| 2019/0139430 | A1* | 5/2019 | Ghatage ................. G09B 5/125 |
| 2019/0189020 | A1* | 6/2019 | Punia ..................... G06N 20/20 |

OTHER PUBLICATIONS

Liarokapis et al., "Personalizing Virtual and Augmented Reality for Cultural Heritage Indoor Outdoor Experiences" 2008 (Year: 2008).*

* cited by examiner

*Primary Examiner* — Dawaune A Conyers
(74) *Attorney, Agent, or Firm* — F. Chau & Associates, LLC

(57) ABSTRACT

A system for adapting virtual reality (VR) or augmented reality (AR) content for learning based on a user's interests includes a personalization engine that determines a user's interests and knowledge level regarding a topic, a content modifier that modifies VR or AR content related to the topic according to the users interests and knowledge level, an object selector that selects VR and AR models used to teach the topic during a VR or AR session and modifies the VR and AR models with the modified content based on the user's interests and knowledge level; a VR engine that renders the modified VR and AR models into VR or AR images, and a VR display that displays the VR or AR images. The user's engagement is measured during interaction with the VR display and used to refine and improve an understanding of the user's interest and knowledge level regarding the topic.

19 Claims, 4 Drawing Sheets

ADAPTABLE VR AND AR CONTENT FOR LEARNING BASED ON USER'S INTERESTS

TECHNICAL FIELD

Embodiments of the present disclosure are directed to methods and systems for virtual reality (VR) and augmented reality (AR).

DISCUSSION OF THE RELATED ART

Virtual reality (VR) simulates a real or imagined environment so that a user can interact with it as if physically present. It is an a immersive computer-generated simulation of a three-dimensional image or environment that can be interacted with in a seemingly real or physical way by a person using special electronic equipment, such as a helmet with a screen inside or gloves fitted with sensors. VR technology typically uses virtual reality headsets to generate realistic images, sounds and other sensations that simulate a user's physical presence in a virtual or imaginary environment. A person using virtual reality equipment is able to "look around" the artificial world, move around in it, and interact with virtual features or items. Augmented reality (AR) is a live view of a physical, real-world environment that is merged with computer-generated images across multiple sensory modalities, instead of putting the user within a complete simulation, AR layers virtual information over a live camera feed, into a headset, phone screen etc. The overlaid sensory information can add to the natural environment or mask the natural environment, and is spatially registered with the physical world such that a user perceives herself as being immersed in the real environment. Unlike virtual reality, which replaces the real world environment with a simulated environment, augmented reality alters one's current perception of a real world environment.

When presenting a single content in VR/AR systems to different users, the content may need modification and personalization based on the user characteristics to engage the user and deliver the right amount of knowledge. For example, if a 10 year old boy has a keen interest in dinosaurs, to engage him more while learning about geography of the world, VR/AR content on world geography can be modified to use a dinosaur to narrate the story, provide a visual of a dinosaur that gives a guided tour of world regions, and incorporates certain dinosaur facts into the story to ensure user is fully engaged. If previous learning history indicates the user might not know about mountain formation, so extra content regarding mountain formation can be added to the original content when teaching about mountains of the world. In this scenario, details about plate tectonics can be omitted, as this concept might prove too advanced for the user of this profile.

SUMMARY

Exemplary embodiments of the present disclosure are directed to systems and methods for maintaining user profiles to determine user interest and background knowledge, tagging objects in the VR/AR world to indicate an allowed level of manipulation to not corrupt the knowledge, modifying content by adding/removing parts of content on the fly to match the user's knowledge level, and by replacing content objects for personalization to engage the user, before the content is delivered to the user on a VR/AR display.

According to an embodiment of the disclosure, there is provided a system for adapting virtual reality (VR) or augmented reality (AR) content for learning based on a user's interests. The system includes a personalization engine that determines a user's interests and current knowledge level regarding a topic of interest, a content modifier that receives the user's interests and current knowledge level from the personalization engine and modifies VR or AR content related to the topic of interest according to the users interests and current knowledge level, an object selector that receives the user's interests and current knowledge level from the personalization engine and modified content from the content modifier and selects VR and AR models used to teach the topic of interest during a VR or AR session and modifies the VR and VR models with the modified content based on the user's interests and current knowledge level; a VR engine that receives modified VR and AR models from the object selector and renders the modified VR and AR models into VR or AR images, and a VR display that displays the VR or AR images. The user's engagement is measured during interaction with the VR display and fed back into the personalization engine to refine and improve an understanding of the user's interest and current knowledge level regarding the topic of interest.

According to a further embodiment of the disclosure, the system includes a content store that stores VR and AR content regarding a plurality of topics of interest and meta data about the VR and AR content, and an object store that stores a collection of VR and AR models related to the plurality of topics of interest stored in the content store, wherein models are tagged to identify ontologies and understand inter-dependencies;

According to a further embodiment of the disclosure, the personalization engine mines the user's social media and other on-line behavior to determine the user's interests and current knowledge level, maintains a user profile with information of the user, a database of the user's objects of interest, and tracks the user's current knowledge level and past learning history.

According to a further embodiment of the disclosure, the personalization engine determines the user's interests by one or more of presenting a range of interest categories to the user for the user to select, asking questions of varied complexity/knowledge level on a subject matter to determine a new user's knowledge level, tracking an existing user's progression on learning a selected topic of interest, or receiving an evaluation from an instructor.

According to a further embodiment of the disclosure, the personalization engine comprises an interest and knowledge level tracking module linked to the user's profile that tracks and analyses the user's online activity, categorizes the user's actions into a predefined set of interest categories, and utilizes the tracked user's actions to calculate and assign knowledge levels for various topics of interest offered in the VR/AR system.

According to a further embodiment of the disclosure, when the user's current knowledge level and learning history indicates that the VR or AR content has topics with which the user is unfamiliar, the content modifier searches the content store for the unfamiliar topics to add annotations, captions or extra VR or AR sections on the unfamiliar topics to the VR or AR content.

According to a further embodiment of the disclosure, the object selector customizes VR and AR models used to teach the topic of interest by retrieving one or more personalized objects from the object store, ranking the personalized objects in order of interest to the user, injecting those personalized objects which are appropriate for the context of the topic of interest into content of the modified VR and AR models, and stores the appropriate personalized objects in the object store along with a set of tags that describe characteristics of the appropriate personalized objects.

According to another embodiment of the disclosure, there is provided a method for adapting virtual reality (VR) and augmented reality (AR) content for learning based on a user's interests. The method includes the steps of determining a user's interests and current knowledge level regarding a topic of interest, modifying VR or AR content related to the topic of interest according to the users interests and background knowledge, selecting VR and AR models used to teach the topic of interest during a VR or AR session and modifying the VR and AR models with the modified content based on the user's interests and current knowledge level, rendering content of modified VR and AR models into VR or AR images and displaying the VR or AR images, and measuring the user's engagement level during interaction with the displayed images and feeding back the user's engagement level to refine and improve an understanding of user's interest and current knowledge level of the topic of interest.

According to a further embodiment of the disclosure, determining a user's interests and current knowledge level regarding a topic of interest comprises further comprising mining the user's social media and other on-line behavior to determine the user's interests and knowledge level, maintaining a user profile with information of the user and a database of the user's objects of interest, and tracking the user's background knowledge and past learning history.

According to a further embodiment of the disclosure, determining the user's interests comprises one or more of presenting a range of interest categories to the user for user's interest selection, asking questions of varied complexity/knowledge level on a subject matter to determine a new user's knowledge level, tracking an existing user's progression on learning a selected topic of interest, or receiving an evaluation from an instructor.

According to a further embodiment of the disclosure, the method includes tracking and analyzing the user's online activity, categorizing the user's actions into a predefined set of interest categories, and utilizing the tracked user's actions to calculate and assign knowledge levels for various topics of interest offered in an VR/AR system.

According to a further embodiment of the disclosure, when the user's background knowledge and learning history indicates that the VR or AR content has topics with which the user is unfamiliar, searching a content store for the unfamiliar topics to add annotations, captions or extra VR or AR sections on the unfamiliar topics to the VR or AR content.

According to a further embodiment of the disclosure, the method includes customizing the VR and AR models used to teach the topic of interest by ranking the personalized objects in order of interest to the user, injecting those personalized objects which are appropriate for the context of the topic of interest into content of the modified VR and AR models, and storing the appropriate personalized objects along with a set of tags that describe characteristics of the appropriate personalized objects.

According to another embodiment of the disclosure, there is provided a computer program product for adapting virtual reality (VR) or augmented reality (AR) content for learning based on a user's interests comprising a non-transitory program storage device readable by a computer, tangibly embodying a program of instructions executed by the computer to cause the computer to perform a method for adapting virtual reality (VR) or augmented reality (AR) content for learning based on a user's interests.

DETAILED DESCRIPTION OF EXEMPLARY EMBODIMENTS

Figure 1:
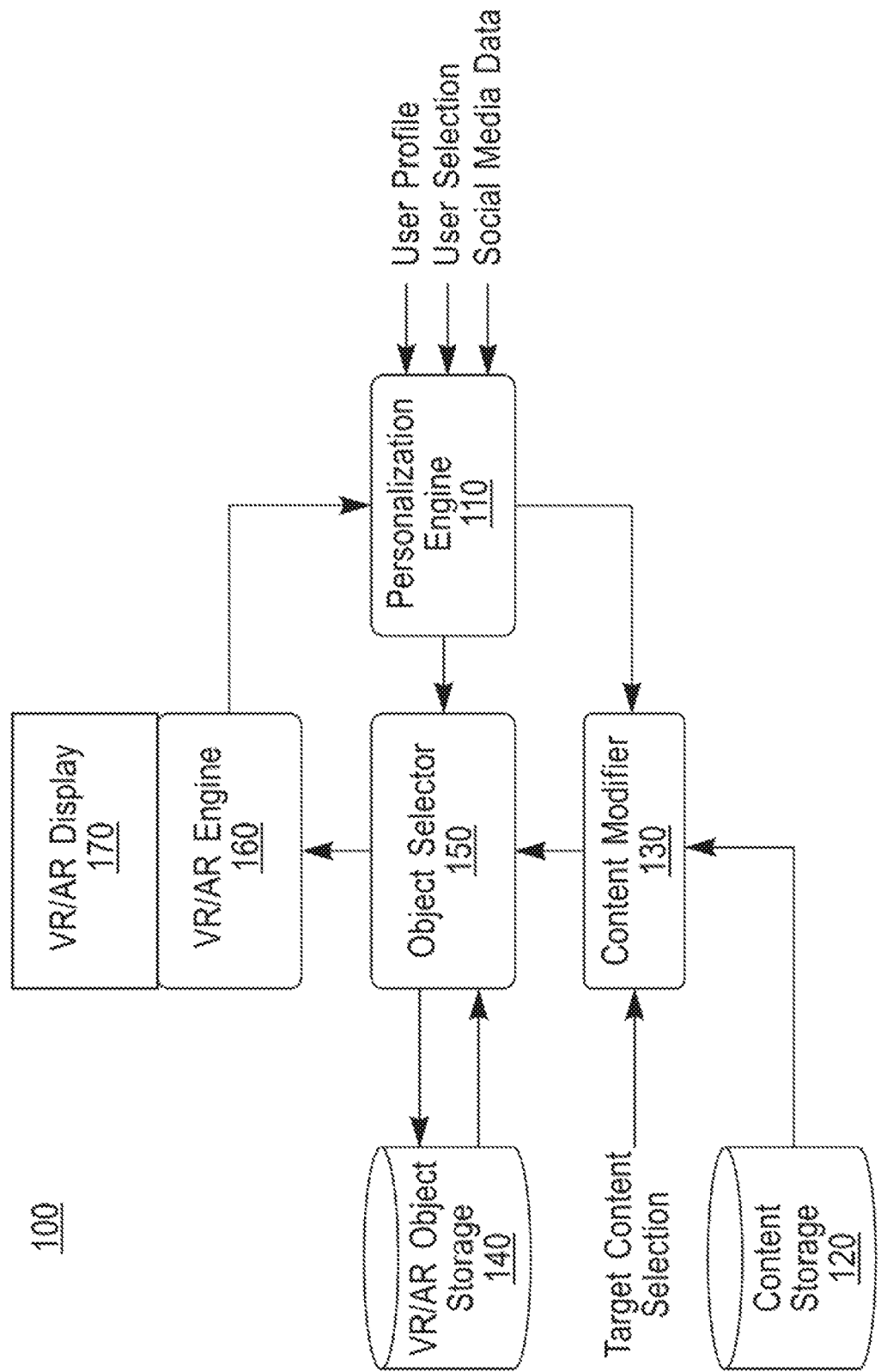
FIG. 1 is a block diagram of an virtual reality (VR)/augmented reality (AR) system according to an embodiment of the disclosure.

Exemplary embodiments of the disclosure as described herein generally provide systems and methods for adapting VR and AR content for learning based on user's interests. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

FIG. 1 is a block diagram of an AR/VR system 100 according to an embodiment of the disclosure. A system according to an embodiment includes a personalization engine 110, content storage 120, a content modifier 130, object storage 140, an object selector 150, a VR engine 160 and a VR display 170.

The personalization engine 110 according to an embodiment receives a user's selection of a topic to learn and a target time for learning the topic, determines a user's interests and preferences, and sends the user's interests to the object selector 150 and content modifier 130, which will use the user's interests to customize VR content to personalize the learning experience. One way this can be achieved is by mining the user's social media and other on-line behavior, such as Netflix, Twitter, etc., to determine the user's interests. The personalization engine 110 also maintains a user profile with information such as age, sex, location, etc., of the user, which can be used to narrow down the user's interest. The personalization engine 110 can also keep track of a user's background knowledge and past learning history.

According to embodiments, there are no limits on how a AR/VR system can receive input selections. Input can come from any input device, smart phone, touch screen, voice command, gesture, keyboard, VR controller, even a brain-machine interface.

The personalization engine 110 can use a variety of techniques to determine a user's interests and knowledge level of a subject matter. Some explicit techniques include presenting a range of interest categories to the user for user's interest selection. Similarly, personalization engine can ask questions of varied complexity/knowledge level on a subject matter to determine a new user's knowledge level. The knowledge level of existing users can be determined by tracking their progression on the course/subject. In addition, in cases where an external instructor is available for the course/subject, the instructor's input/evaluation can be another source for determining a user's knowledge level.

According to further embodiments, implicit techniques can take the form of tracking user's interests from various external sources for which the user has given access permission. This could be in the form of a module that is part of the personalization engine 110, such as an interest and knowledge level tracking module that tracks and analyses the user's online activity, such as web searches, social media posts, online content consumption, including textual, audio, video content, etc. A tracking module can categorize the user's actions into a predefined set of interest categories. Use of an interest and knowledge level tracking module makes it possible to track temporal changes in user's interests and ensures that the personalization engine's determination of user interests is up to date. An interest and knowledge level tracking module according to an embodiment can also utilize the tracked user actions to calculate and assign knowledge levels for various subject matters relevant to the subject matters offered in a VR/AR system. An interest and knowledge level tracking module can be linked to each user's profile on the VR/AR system. For example, the VR/AR system can offer a VR content covering "geography of the world". The interest and knowledge level tracking module can collect metadata on all geography related content that the user has consumed outside the VR/AR system and use it to determine the user's current knowledge level of "geography of the world". For example, if the user is accessing various content tagged as Australia, geography, year 5, then the system will determine the user's current knowledge level for "geography of the world" to be year 5 Australia specific. This information is then used by the Content Selector to select content appropriate for this level of understanding.

The personalization engine 110 can also maintain a database of objects of interest. The personalization engine mines the user's online data, profile data and asks simple questions, such as "What is your favorite animal?", "What is your favorite cartoon character?", "What is your favorite mammal?", to build a database of user's objects of interest. This information about a user's favorite objects can be later used by the object selector module 150 to select objects in the VR world.

The content storage 120 according to an embodiment stores all content and meta data about the content, and provides it to the content storage 120 upon request.

The content modifier 130 according to an embodiment receives a target content selection, which is content associated with the topic of interest to be learned, and input from the personalization engine 110 and then modifies the VR/AR content received from the content storage 120 according to the user's interests and background knowledge. If the user's background knowledge and learning history indicates that the target content has topics which the user has not learned in the past, the content modifier 130 searches the content storage 120 for the topic to add annotations, captions or extra VR/AR sections on the unfamiliar topics to the current content. In an example according to an embodiment, the content is "geography of the world". The content modified by the content modifier 130 is subsequently delivered to the object selector 150 which incorporates objects customized for each users interests into the VR/AR experience; thus creating a highly personalized experience which can increase engagement levels with the user.

Unlike prior solutions, a proposed solution according to an embodiment has layers of VR content, and is therefore more practical and less expensive to maintain. One layer acts as a 'base layer' on to which additional layers will be imposed, with each layer increasing the level of personalization. In an example according to an embodiment, the base VR/AR layer would be "geography of the world". A personalization layer would determine that a user has a particular interest in learning more about the formation of mountains, in which case an additional AR/VR layer relating to mountain formation will be selected from the content storage 120 and combined with the base layer.

According to embodiments, once all appropriate layers have been combined in this way, the VR/AR content is passed to the object selector 150 which incorporates objects aligned with the users interests, thus further personalizing the experience.

An object storage 140 according to an embodiment is a collection of VR/AR models that can be swapped into the current content. Models in the storage are tagged to identify ontologies and understand inter-dependencies.

According to embodiments, AR/VR content refers to a whole of a VR/AR world, including the objects, scene, story, flow and movement, instructions, educational content, text, audio, music, i.e., everything that is communicated through a VR/AR device. On the other hand, an AR/VR model refers to individual visible objects that are part of the VR/AR world, that compose the previously mentioned content.

The object selector 150 according to an embodiment receives input from the personalization engine 110 and modified content from the content modifier 130 and selects and modifies the objects stored in the VR/AR object storage 140 used during a VR/AR session. For example, if the story requires an animal with 4 legs, then a system according to an embodiment needs to understand that using a gorilla for this part of the story will not be appropriate, even if the user is interested in gorillas, in an example according to an embodiment, the object is the dinosaur in/narrating the story.

According to an embodiment, the object selector 150 customizes the experience by injecting personalized objects, such as a dinosaur, into the VR content. The object selector 150 is informed of which objects to include or exclude in the story by the personalization engine 110 and retrieves the relevant objects from the object storage 140. The object selector 150 also ranks the objects in order of interest to the user. This ranking helps determine the exposure, i.e. VR time, of these objects within the VR content; those with higher ranking gain more exposure and thus the VR content can become highly personalized for each individual user.

According to an embodiment, since the object selector 150 only includes objects which are appropriate for the context of the content being delivered, the objects can be seamlessly integrated into the VR content. In an example according to an embodiment, the topic may call for any four legged animal to narrate the story. For a 10 year old child with keen interests in dinosaurs, this could be an animated Brontosaurus, whereas for a 16 year old with the same interests in dinosaurs, the rendering of the dinosaur would be more lifelike. In a case where the user has interest in horses, then the dinosaur would be replaced by a horse. Furthermore, if both users have a similar understanding of the topic, then the message delivered in both cases is the same, it is the delivery method which differs.

According to an embodiment, to achieve this integration, the object storage 140 stores the object along with a set of tags that describe characteristics of that object. This tagging can be achieved by a combination of manual processing and machine learning.

The VR engine 160 according to an embodiment takes input from the content modifier 130 and the object selector 140 and renders the images on a VR display 170.

User engagement is measured during interaction and fed back into the personalization engine 110 to refine and improve the understanding of user's interest and current knowledge level.

According to an embodiment, the VR engine 160 measures the time a user spends looking at an object or scene in the VR world. In addition, the VR engine 160 measures how fast a user reacts to introduction and exiting of objects and scenes in the VR world by measuring how long it takes the user to notice a new object and turn towards it. The VR engine 160 also measures how long the user has looked at an object before looking at a different object or scene and if the user has moved towards the object and has tried to interact with the object and for how long. In short, the VR engine 160 measure how much attention or screen time any object/scene/topic receives from the user. This information is then fed back into the personalization engine 110 to update the database of the user's objects of interest.

Figure 2:
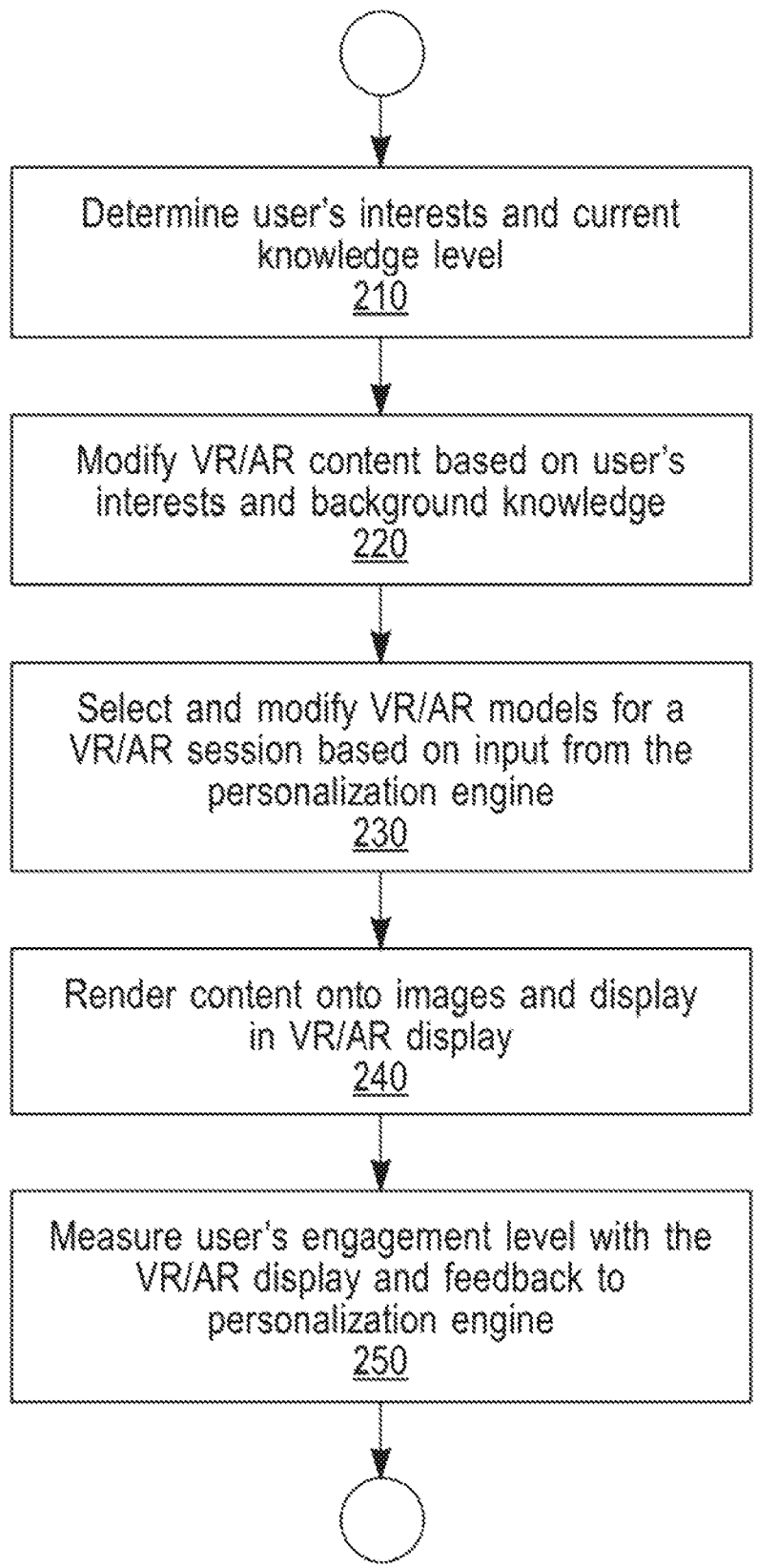
FIG. 2 is a flowchart of a method for adapting virtual reality (VR) and augmented reality (AR) content for learning based on a user's interests, according to an embodiment of the disclosure.

FIG. 2 is a flowchart of a method for adapting VR and AR content for learning based on a user's interests, according to an embodiment of the disclosure. Referring now to the figure, a method includes determining a user's interests and current knowledge level at step 210 by mining the user's social media and other on-line behavior to determine the user's interests, maintaining a user profile with information of the user, and tracking the user's background knowledge and past learning history. At step 220, VR or AR content is modified according to the user's interests and background knowledge based on input from the personalization engine. At step 230, the VR and AR models for a VR or AR session are selected based on input from the personalization engine, and modified with the modified content based on the user's interests and current knowledge level. When the user's background knowledge and learning history indicates that the VR or AR content has topics with which the user is unfamiliar, the VR/AR engine searches a content storage for the unfamiliar topics to add annotations, captions or extra VR or AR sections on the unfamiliar topics to the VR or AR content. At step 240, content is rendered onto images and displayed in a VR/AR display. At step 250, the user's engagement level during interaction with the VR display is measured and feeding back the user's engagement level into the personalization engine to refine and improve an understanding of user's interest and current knowledge level.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to a schematic of an example of a cloud computing node is shown. Cloud computing node 310 is only one example of a suitable cloud computing node and is not intended to suggest any limitation as to the scope of use or functionality of embodiments of the disclosure described herein. Regardless, cloud computing node 310 is capable of being implemented and/or performing any of the functionality set forth herein above.

In cloud computing node 310 there is a computer system/server 312, which is operational with numerous other general purpose or special purpose computing system environments or configurations. Examples of well-known computing systems, environments, and/or configurations that may be suitable for use with computer system 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

Figure 3:
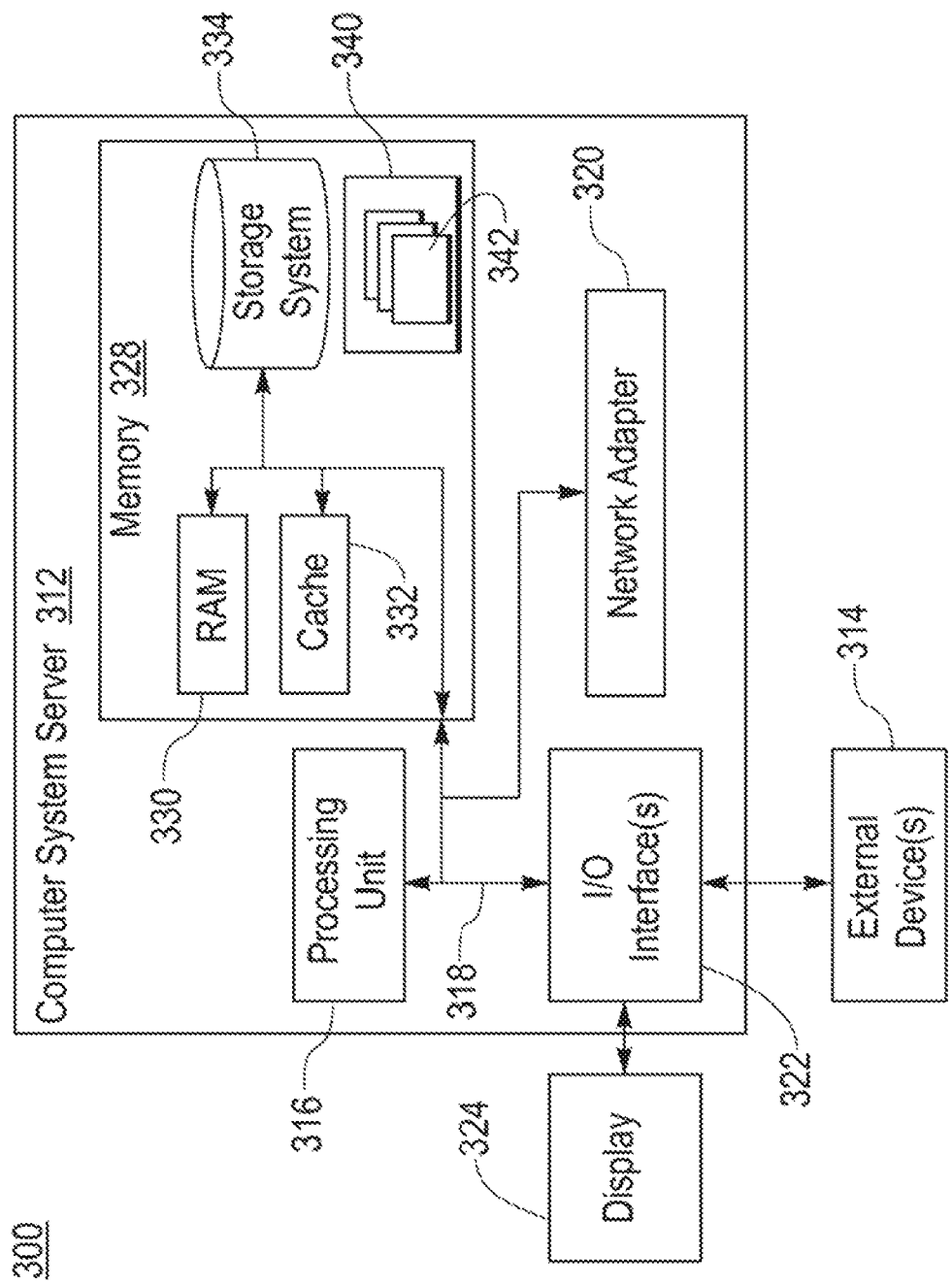
FIG. 3 is a schematic of an exemplary cloud computing node that implements an embodiment of the disclosure.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided, in such instances, each can be connected to bus 418 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the disclosure as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
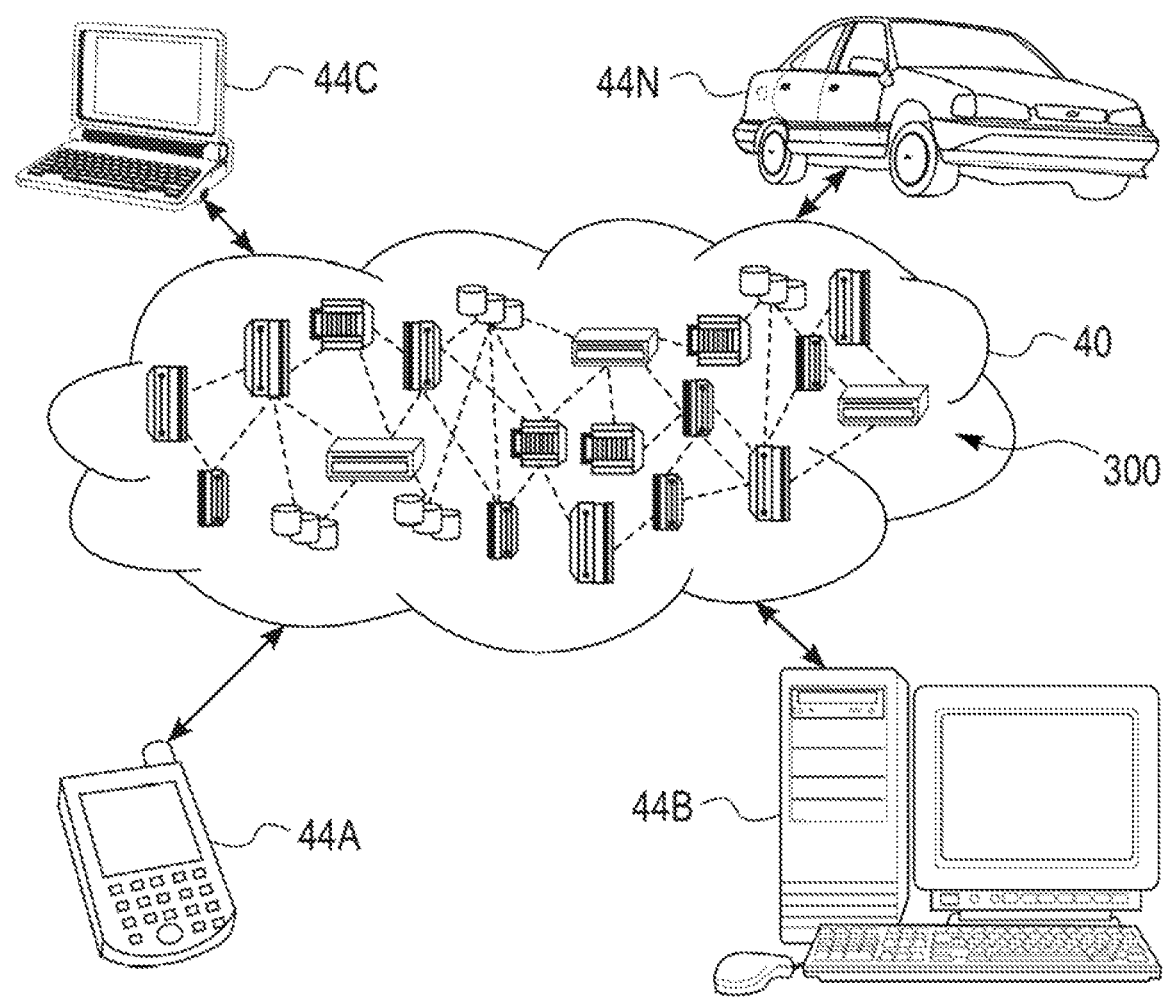
FIG. 4 shows an exemplary cloud computing environment according to embodiments of the disclosure.

Referring now to FIG. 4, illustrative cloud computing environment 40 is depicted. As shown, cloud computing environment 40 comprises one or more cloud computing nodes 300 with which local computing devices used by cloud consumers, such as, for example, personal digital assistant (PDA) or cellular telephone 44A, desktop computer 44B, laptop computer 44C, and/or automobile computer system 44N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 300 and cloud computing environment 40 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A system for adapting virtual reality (VR) or augmented reality (AR) content for learning based on a user's interests, comprising:
a processor;
a memory on which is stored instructions that when executed by the processor cause the processor to implement:
a personalization engine that determines a user's interests and current knowledge level regarding a topic of interest and personalized objects related to the topic of interest;
a content modifier that receives the user's interests and current knowledge level from the personalization engine and modifies VR or AR content related to the topic of interest according to the user's interests and current knowledge level;
an object selector that receives the user's interests, current knowledge level and personalized objects from the personalization engine and modified content from the content modifier and selects VR and AR models used to teach the topic of interest during a VR or AR session, modifies the selected VR and AR models with the modified content based on the user's interests and current knowledge level, and ranks the personalized objects in order of interest to the user, wherein ranking determines an exposure time of the personalized objects within the modified VR or AR content, wherein a personalized object with a higher ranking gains exposure time, wherein a VR model includes information for generating an immersive simulation of a three-dimensional image or environment and an AR model includes information for generating three-dimensional images that are configured to be merges with a live view of a physical, real-world environment;
a VR engine that receives modified VR and AR models from the object selector and renders the modified VR and AR models into VR or AR images; and
a VR display that displays the VR or AR images, wherein the user's engagement is measured during interaction with the VR display and feeding back into the personalization engine to refine and improve an understanding of the user's interest and current knowledge level regarding the topic of interest.

2. The system of claim 1, further comprising:
a content store that stores VR and AR content regarding a plurality of topics of interest and meta data about the VR and AR content; and
an object store that stores a collection of VR and AR models related to the plurality of topics of interest stored in the content store, wherein models are tagged to identify ontologies and understand inter-dependencies.

3. The system of claim 1, wherein the personalization engine
mines the user's social media and other on-line behavior to determine the user's interests and current knowledge level,
maintains a user profile with information of the user, a database of the user's objects of interest, and tracks the user's current knowledge level and past learning history.

4. The system of claim 3, wherein the personalization engine determines the user's interests by one or more of
presenting a range of interest categories to the user for the user to select,
asking questions of varied complexity/knowledge level on a subject matter to determine a new user's knowledge level,
tracking an existing users progression on learning a selected topic of interest, or
receiving an evaluation from an instructor.

5. The system of claim 3, wherein the personalization engine comprises an interest and knowledge level tracking module linked to the users profile that
tracks and analyses the user's online activity,
categorizes the user's actions into a predefined set of interest categories, and
utilizes the tracked user's actions to calculate and assign knowledge levels for various topics of interest offered in the VR/AR system.

6. The system of claim 2, wherein when the user's current knowledge level and learning history indicates that the VR or AR content has topics with which the user is unfamiliar, the content modifier searches the content store for the unfamiliar topics and adds annotations, captions or extra VR or AR sections on the unfamiliar topics to the VR or AR content.

7. The system of claim 2, wherein the object selector customizes VR and AR models used to teach the topic of interest by
retrieving one or more of the personalized objects from the object store,
injecting those personalized objects which are appropriate for the context of the topic of interest into content of the modified VR and AR models, and
stores the appropriate personalized objects in the object store along with a set of tags that describe characteristics of the appropriate personalized objects.

8. A computer-implemented method for adapting virtual reality (VR) and augmented reality (AR) content for learning based on a user's interests, wherein the computer performs the following steps of:
determining a users interests and current knowledge level regarding a topic of interest and personalized objects related to the topic of interest;

modifying VR or AR content related to the topic of interest according to the users interests and background knowledge;

selecting VR and AR models used to teach the topic of interest during a VR or AR session, modifying the selected VR and AR models with the modified content based on the users interests and current knowledge level, and ranking personalized objects in order of interest to the user, wherein ranking determines an exposure time of the personalized objects within the modified VR or AR content, wherein a personalized object with a higher ranking gains exposure time, wherein a VR model includes information for generating an immersive simulation of a three-dimensional image or environment and an AR model includes information for generating three-dimensional images that are configured to be merges with a live view of a physical, real-world environment;

rendering content of modified VR and AR models into VR or AR images and displaying the VR or AR images; and measuring the users engagement level during interaction with the displayed images and feeding back the user's engagement level to refine and improve an understanding of user's interest and current knowledge level of the topic of interest.

9. The method of claim 8, wherein determining a user's interests and current knowledge level regarding a topic of interest further comprises mining the user's social media and other on-line behavior to determine the user's interests and knowledge level, maintaining a user profile with information of the user and a database of the user's objects of interest, and tracking the user's background knowledge and past learning history.

10. The method of claim 9, wherein determining the user's interests comprises one or more of presenting a range of interest categories to the user for users interest selection, asking questions of varied complexity/knowledge level on a subject matter to determine a new user's knowledge level, tracking an existing users progression on learning a selected topic of interest, or receiving an evaluation from an instructor.

11. The method of claim 9, further comprising tracking and analyzing the user's online activity, categorizing the user's actions into a predefined set of interest categories, and utilizing the tracked, user's actions to calculate and assign knowledge levels for various topics of interest offered in an VR/AR system.

12. The method of claim 8, further comprising, when the user's background knowledge and learning history indicates that the VR or AR content has topics with which the user is unfamiliar, searching a content store for the unfamiliar topics to add annotations, captions or extra VR or AR sections on the unfamiliar topics to the VR or AR content.

13. The method of claim 8, further comprising customizing the VR and AR models used to teach the topic of interest by injecting those personalized objects which are appropriate for the context of the topic of interest into content of the modified VR and AR models, and storing the appropriate personalized objects along with a set of tags that describe characteristics of the appropriate personalized objects.

14. A computer program product for adapting virtual reality (VR) or augmented reality (AR) content for learning based on a users interests comprising a non-transitory program storage device readable by a computer, tangibly embodying a program of instructions executed by the computer to cause the computer to perform a method comprising the steps of:

determining a users interests and current knowledge level regarding a topic of interest and personalized objects related to the topic of interest;

modifying VR or AR content related to the topic of interest according to the users interests and background knowledge;

customizing VR and AR models used to teach the topic of interest by ranking the personalized objects in order of interest to the user, wherein ranking determines an exposure time of the personalized objects within the modified VR or AR content, wherein a personalized object with a higher ranking gains exposure time, injecting those personalized objects which are appropriate for the context of the topic of interest into the modified VR or AR content of VR and AR models, and storing the appropriate personalized objects along with a set of tags that describe characteristics of the appropriate personalized objects, wherein a VR model includes information for generating an immersive simulation of a three-dimensional image or environment and an AR model includes information for generating three-dimensional images that are configured to be merges with a live view of a physical, real-world environment;

searching a content store for the unfamiliar topics to add annotations, captions or extra VR or AR sections on the unfamiliar topics to the VR or AR content, when the user's background knowledge and learning history indicates that the VR or AR content has topics with which the user is unfamiliar and rendering content of customized VR and AR models into VR or AR images and displaying the VR or AR images.

15. The computer program product of claim 14, wherein determining a users interests and current knowledge level regarding a topic of interest comprises further comprising mining the user's social media and other on-line behavior to determine the laser's interests and knowledge level, maintaining a user profile with information of the user and a database of the use's objects of interest, and tracking the user's background knowledge and past learning history.

16. The computer program product of claim 15, wherein determining the user's interests comprises one or more of presenting a range of interest categories to the user for use's interest selection, asking questions of varied complexity/knowledge level on a subject matter to determine a new users knowledge level, tracking are existing user's progression on learning a selected topic of interest, or receiving an evaluation from an instructor.

17. The computer program product of claim 15, the method further comprising tracking and analyzing the user's online activity, categorizing the user's actions into a predefined set of interest categories, and utilizing the tracked user's actions to calculate and assign knowledge levels for various topics of interest offered in an VR/AR system.

18. The computer program product of claim 14, the method further comprising
   measuring the user's engagement level during interaction with the displayed images and
   feeding back the user's engagement level to refine and improve an understanding of user's interest and current knowledge level of the topic of interest.

19. The computer program product of claim 14, the method further comprising:
   selecting VR and AR models used to teach the topic of interest during a VR or AR session and
   modifying the selected VR and AR models with the modified content based on the user's interests and current knowledge level.

* * * * *